US012709261B2

(12) United States Patent
Wang et al.

(10) Patent No.: US 12,709,261 B2
(45) Date of Patent: Aug. 18, 2026

(54) PARKING FAULT DETECTION METHOD, APPARATUS, SYSTEM AND WORKING MACHINERY

(71) Applicant: HUZHOU SANY LOADER CO., LTD., Huzhou (CN)

(72) Inventors: Xianqing Wang, Huzhou (CN); Yi Huang, Huzhou (CN); Bang Liu, Huzhou (CN); Taotao Zhan, Huzhou (CN)

(73) Assignee: HUZHOU SANY LOADER CO., LTD., Huzhou (CN)

( * ) Notice: Subject to any disclaimer, the term of this patent is extended or adjusted under 35 U.S.C. 154(b) by 39 days.

(21) Appl. No.: 18/657,356

(22) Filed: May 7, 2024

(65) Prior Publication Data

US 2024/0286597 A1 Aug. 29, 2024

Related U.S. Application Data

(63) Continuation of application No. PCT/CN2023/082225, filed on Mar. 17, 2023.

(30) Foreign Application Priority Data

May 31, 2022 (CN) ........................ 202210613759.1

(51) Int. Cl.
*B60T 17/22* (2006.01)
*B60W 10/119* (2012.01)
(Continued)

(52) U.S. Cl.
CPC ........... *B60T 17/22* (2013.01); *B60W 10/119* (2013.01); *B60W 10/182* (2013.01);
(Continued)

(58) Field of Classification Search
CPC ... B60T 17/22; B60W 10/119; B60W 10/182; B60W 50/0205; B60W 2050/0008;
(Continued)

(56) References Cited

U.S. PATENT DOCUMENTS 9,346,449 B1 * 5/2016 Chang .................. B60T 17/221
10,047,862 B2 * 8/2018 Tuhro ..................... F16H 63/48
(Continued)

FOREIGN PATENT DOCUMENTS

CN 102343815 A 2/2012
CN 102602385 A 7/2012
(Continued)

OTHER PUBLICATIONS

First Office Action issued in counterpart Chinese Patent Application No. 202210613759.1, dated Feb. 1, 2023.
(Continued)

*Primary Examiner* — Jason Holloway
*Assistant Examiner* — Madison B Emmett
(74) *Attorney, Agent, or Firm* — Maier & Maier, PLLC

(57) ABSTRACT

Disclosed are a parking fault detection method, an apparatus, a system and a working machinery. The method includes: acquiring a parking control signal; the parking control signal is a parking signal or a parking release signal; in response to that it is determined that a parking control condition is met, generating a parking control instruction according to the parking control signal and sending the parking control instruction to a parking brake component of a working machinery; the parking brake component is configured to execute parking or parking release action according to the parking control instruction, and the parking control instruction is configured to correspond to the parking control signal; and acquiring a feedback signal of the parking brake component, and acquiring a parking fault
(Continued)

detection result of the working machinery according to the feedback signal.

9 Claims, 5 Drawing Sheets

(51) Int. Cl.
*B60W 10/18* (2012.01)
*B60W 50/00* (2006.01)
*B60W 50/02* (2012.01)

(52) U.S. Cl.
CPC . *B60W 50/0205* (2013.01); *B60W 2050/0008* (2013.01); *B60W 2050/021* (2013.01); *B60W 2300/17* (2013.01); *B60W 2510/186* (2013.01)

(58) Field of Classification Search
CPC ....... B60W 2050/021; B60W 2300/17; B60W 2510/186; Y02T 10/40
See application file for complete search history.

(56) References Cited

U.S. PATENT DOCUMENTS

| | | | | |
|---|---|---|---|---|
| 12,030,497 | B2 * | 7/2024 | Gabor | F16H 63/48 |
| 12,084,035 | B2 * | 9/2024 | Li | B60T 7/12 |
| 2006/0097569 | A1 * | 5/2006 | Eberling | B60T 8/88 303/9.66 |
| 2013/0268171 | A1 | 10/2013 | Huls et al. | |
| 2017/0037919 | A1 * | 2/2017 | Nishikawa | F16D 65/18 |
| 2022/0258704 | A1 * | 8/2022 | Byeon | B60W 30/18036 |
| 2022/0371568 | A1 * | 11/2022 | Chung | B60T 13/741 |
| 2025/0222785 | A1 * | 7/2025 | Devaraj | B60K 7/0007 |

FOREIGN PATENT DOCUMENTS

| | | | |
|---|---|---|---|
| CN | 207416810 | U | 5/2018 |
| CN | 108248581 | A | 7/2018 |
| CN | 108361370 | A | 8/2018 |
| CN | 109866749 | A | 6/2019 |
| CN | 109941244 | A | 6/2019 |
| CN | 110497898 | A | 11/2019 |
| CN | 111497850 | A | 8/2020 |
| CN | 112721650 | A | 4/2021 |
| CN | 214565285 | U | 11/2021 |
| CN | 214578791 | U | 11/2021 |
| CN | 114954412 | A | 8/2022 |
| DE | 102014110426 | A1 | 2/2015 |
| JP | 2004314756 | A | 11/2004 |
| JP | 2019167053 | A | 10/2019 |
| KR | 20130009029 | A | 1/2013 |
| WO | 2022028115 | A1 | 2/2022 |

OTHER PUBLICATIONS

International Search Report and Written Opinion issued in corresponding PCT Application No. PCT/CN2023/082225, dated Jul. 10, 2023.
Notification to Grant Patent Right for Invention issued in counterpart Chinese Patent Application No. 202210613759.1, dated Jul. 28, 2023.

* cited by examiner

PARKING FAULT DETECTION METHOD, APPARATUS, SYSTEM AND WORKING MACHINERY

CROSS-REFERENCE TO RELATED APPLICATIONS

The present application is a continuation application of International Application No. PCT/CN2023/082225, filed on Mar. 17, 2023, which claims priority to Chinese Patent Application No. 202210613759.1, filed on May 31, 2022. The disclosures of the above-mentioned applications are incorporated herein by reference in their entireties.

TECHNICAL FIELD

The present application relates to the technical field of construction machinery, and in particular to a parking fault detection method, an apparatus, a system and a working machinery.

BACKGROUND

The current parking brake usually includes the following three methods: 1) the traditional parking brake is manual, and the pawl is pulled by a cable, so that the pawl is snapped with the ratchet, and the parking brake is realized; 2) at the P gear of the automatic transmission, the latch in the automatic gearbox is clamped to achieve braking; 3) in the electronic parking brake, the gear reduction mechanism is driven by the brake caliper through a motor to achieve parking brake.

However, the first parking brake method requires manual pulling of the cable, which is time-consuming and labor-intensive; the second parking brake method performs rigid braking through the latch clamping, and the braking impact is large; the third parking brake method has a small motor power density and a large volume and has a relatively high requirement for the dustproof and waterproof of the motor, and is usually used in the automotive field and is rarely used in engineering machinery. In addition, for construction machinery, hydraulic parking brakes are also used, which have good waterproof and dustproof effects. However, if a pipe burst occurs, it will easily cause the parking brake to fail, and the existing technology cannot effectively detect the parking fault, so that the reliability of the parking brake cannot be guaranteed.

SUMMARY

The present application provides a parking fault detection method, an apparatus, a system and a working machinery.

According to a first aspect of the present application, a parking fault detection method is provided, including:

- acquiring a parking control signal; the parking control signal is a parking signal or a parking release signal;
- in response to that it is determined that a parking control condition is met, generating a parking control instruction according to the parking control signal and sending the parking control instruction to a parking brake component of a working machinery; the parking brake component is configured to execute parking or parking release action according to the parking control instruction, and the parking control instruction is configured to correspond to the parking control signal; and
- acquiring a feedback signal of the parking brake component, and acquiring a parking fault detection result of the working machinery according to the feedback signal.

In an embodiment, the acquiring the parking fault detection result of the working machinery according to the feedback signal includes:

- acquiring the parking fault detection result of the working machinery according to a comparison result of the feedback signal and the parking control instruction.

In an embodiment, after the acquiring the feedback signal of the parking brake component, and acquiring the parking fault detection result of the working machinery according to the feedback signal, the method further includes:

- determining whether a gear switching condition is met according to the feedback signal of the parking brake component and/or the parking fault detection result;
- in response to that it is determined that the gear switching condition is met, controlling the gear switching control component of the working machinery to perform gear switching according to a gear switching control signal input by a gear switching component of the working machinery; and
- in response to that it is determined that the gear switching condition is not met, controlling the gear switching control component to switch to a preset gear.

In an embodiment, the parking fault detection method further includes:

- in response to that it is determined that the parking control condition is not met, controlling the gear switching control component to switch to the preset gear.

In an embodiment, the in response to that it is determined that the gear switching condition is met, controlling the gear switching control component of the working machinery to perform gear switching according to the gear switching control signal input by the gear switching component of the working machinery includes:

- in response to that it is determined that the gear switching condition is met, acquiring an original state of the gear switching component; and
- in response to that it is determined that the original state of the gear switching component is matched with the preset gear, controlling the gear switching control component to perform gear switching according to the gear switching control signal input by the gear switching component.

In an embodiment, the parking fault detection method further includes:

- in response to that it is determined that the parking control condition is not met, sending a detection signal to the parking brake component;
- acquiring a current signal of a loop where the parking brake component is located; and
- determining the fault detection result of the parking brake component according to the current signal.

According to a second aspect of the present application, a parking fault detection apparatus is provided, including:

- a data acquisition module configured to acquire a parking control signal; the parking control signal is a parking signal or a parking release signal;
- a parking control module configured to, in response to that it is determined that parking control condition is met, generate a parking control instruction according to the parking control signal and send the parking control instruction to the parking brake component of the working machinery; the parking brake component is configured to perform parking or parking release action according to the parking control instruction, and the parking control instruction is configured to correspond to the parking control signal; and a first fault identification module configured to acquire the feedback signal of the parking brake component and acquire the parking fault detection result of the working machinery according to the feedback signal.

According to a third aspect of the present application, a parking fault detection system is provided, including:

a controller;

a parking control component; and a parking signal feedback component;

the parking control component is configured to acquire a parking control signal and send the parking control signal to the controller, and the parking control signal is a parking signal or a parking release signal;

the parking signal feedback component is configured to acquire a feedback signal of the parking brake component of a working machinery and send the feedback signal to the controller; and the controller is respectively connected to the parking control component and the parking signal feedback component, and is configured to, in response to that it is determined that the parking control condition is met, generate a parking control instruction according to the parking control signal and send the parking control instruction to the parking brake component; the parking brake component is configured to perform parking or parking release action according to the parking control instruction; the parking control instruction is configured to correspond to the parking control signal; and the parking brake component is configured to acquire a parking fault detection result of the working machinery according to the feedback signal of the parking brake component.

According to a fourth aspect of the present application, a working machinery is provided, including: a parking brake component and the parking fault detection system.

According to a fifth aspect of the present application, an electronic device is provided, including:

a processor; and a memory storing a computer program executable on the processor, when the computer program is executed by the processor, the parking fault detection method is performed.

According to a sixth aspect of the present application, a non-transitory computer-readable storage medium storing a computer program is provided, when the computer program is executed by a processor, the parking fault detection method is performed.

In the parking fault detection method, apparatus, system and working machinery provided by the present application, the parking control signal is acquired. In response to that it is determined that the parking control condition is met, the parking control instruction is generated according to the parking control signal and sent to the parking brake component of the working machinery, so that the parking control instruction is executed through the parking brake component. After the parking control instruction is sent to the parking brake component, the feedback signal of the parking brake component is acquired, so that the parking fault detection result of the working machinery can be acquired according to the feedback signal.

BRIEF DESCRIPTION OF THE DRAWINGS

In order to illustrate the technical solutions in the embodiments of the present application, the following briefly introduces the accompanying drawings required for the description of the embodiments. Obviously, the drawings in the following description are only part of embodiments of the present application. For those skilled in the art, other drawings can also be obtained according to the structures shown in these drawings without any creative effort.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

Figure 1:
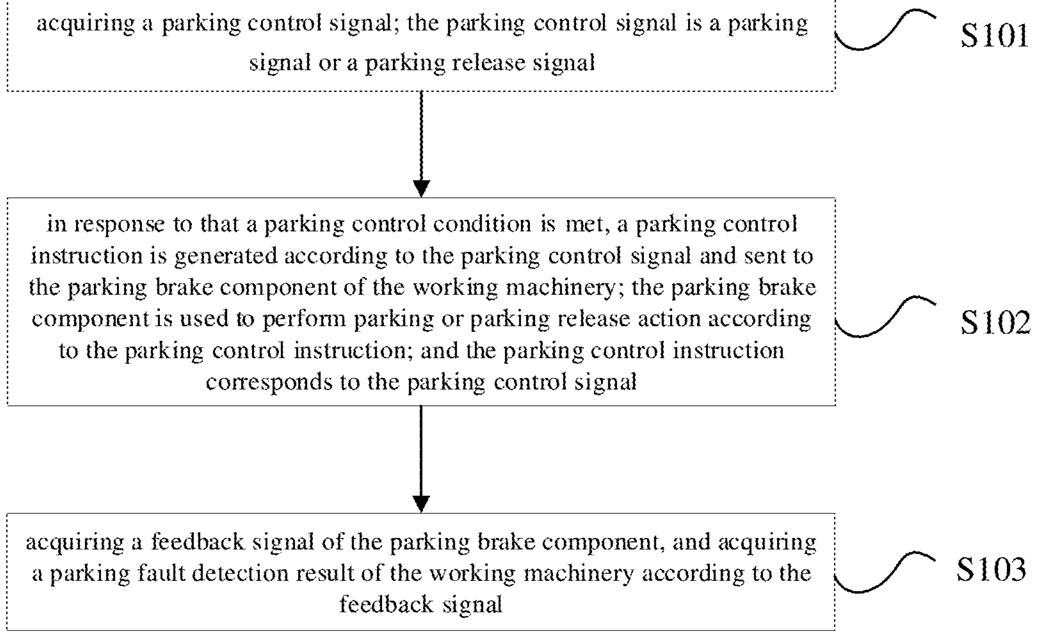
FIG. 1 is a schematic flowchart of a parking fault detection method according to an embodiment of the present application.

The parking fault detection method of the present application is described below with reference to FIG. 1. The parking fault detection method is executed by an electronic device such as a controller or a hardware and/or a software therein. As shown in FIG. 1, the parking fault detection method of the present application includes:

S101, acquiring a parking control signal; the parking control signal is a parking signal or a parking release signal.

Specifically, the parking control signal is the signal input by the operator to control the parking of the working machinery (such as the parking signal) or the signal used to control the parking release of the working machinery (such as parking release signal). The parking control signal can acquired through the parking control component, that is, the parking control signal is input by the operator through the parking control component. The parking control component can be a parking pressing button, a parking release switch, etc.

S102, in response to that a parking control condition is met, a parking control instruction is generated according to the parking control signal and sent to the parking brake component of the working machinery; the parking brake component is used to perform parking or parking release action according to the parking control instruction; and the parking control instruction corresponds to the parking control signal.

Specifically, whether the parking control condition is met can be determined according to the current state of the working machinery. For example, the current state of working machinery can be acquired, such as the starting state of working machinery. The starting state of working machinery can be determined by acquiring the rotational speed signal of the engine. For example, the rotational speed signal of the engine can be collected in real time through the rotational speed sensor, so as to determine whether the current working machinery is in the starting state according to the rotational speed signal. In response to that the rotation speed is 0, it is determined as not started. In response to that the rotation speed is greater than 0, it is determined as started. Whether the parking control condition is met can be determined according to the starting state of the working machinery. For example, if the current working machinery is in the starting state, it is determined that the parking control condition is met.

Whether the parking control condition is met can be determined according to the current state of the working machinery. In response to that the parking control condition is met, a parking control instruction corresponding to the parking control signal is generated and sent to the parking brake component of the working machinery, and the parking control instruction is executed through the parking brake component, so that the parking action or parking release action is completed. Otherwise no parking control instruction is generated, and the parking brake component maintains the current state, or the parking instruction is generated so that the working machinery is always in the parking state, thus effectively avoiding the security risks caused by the parking release when the working machinery is not powered-on. The specific braking method of the parking brake component can be set according to actual needs, for example, it can be an electronic hydraulic braking method.

S103, acquiring a feedback signal of the parking brake component, and acquiring a parking fault detection result of the working machinery according to the feedback signal.

Specifically, the feedback signal of the parking brake component is a signal that feeds back the current state of the parking brake component. The current state of the parking brake component can be the parking state or the parking release state, so that after the parking control instruction is sent to the parking brake component, the feedback signal of the parking brake component is acquired, and the parking fault detection result of the working machinery can be acquired. The parking fault detection result can include the presence of parking fault and the absence of parking fault. The specific method of acquiring the parking fault detection result of the working machinery according to the feedback signal can be set according to actual needs. For example, the feedback signal of the parking brake component can be used to detect whether the parking brake component successfully completes the execution of the parking control instruction. If the parking control instruction is successfully completed, then there is no parking fault. If the execution of the parking control instruction fails, then there is a parking fault. In response to that it is determined that the parking fault exists, the cause of the parking fault can also be determined according to the specific execution state of the parking brake component.

The specific method of acquiring the feedback signal of the parking brake component can be set according to actual needs. For example, the feedback signal of the parking brake component can be acquired through the parking signal feedback component. The parking signal feedback component can include a pressure switch connected to an outlet of the change valve in the parking brake component. During parking release, the pressure switch is disconnected under pressure and a low level signal is output. During parking, the pressure switch is closed and a high level signal is output. The image data of the parking brake component can also be collected through an image acquisition apparatus, and the image data can be identified through the pre-trained machine identification network, so that the current state of the parking brake component can be acquired.

In addition, after the parking fault detection result of the working machinery is acquired, the parking fault detection result can also be displayed through the display apparatus, such as an instrument, a display screen, etc., so that the operator can detect the fault in time and perform troubleshooting.

Traditional methods cannot effectively detect parking faults during the parking brake control process. When parking fails, it is easy to cause the working machinery to slip, which poses a great safety hazard. When parking release fails, it is very easy for the working machinery to drive in the parking state, which causes damage to the brake disk. Therefore, traditional methods cannot guarantee the reliability of the parking brake.

In an embodiment of the present application, when the parking control signal is acquired and the parking control condition is determined to be met, the parking control instruction is generated according to the parking control signal and sent to the parking brake component of the working machinery, so that the parking control instruction is executed through the parking brake component. After the parking control instruction is sent to the parking brake component, the feedback signal of the parking brake component is acquired, and the parking fault detection result of the working machinery is acquired according to the feedback signal, so that when the parking control fails, the fault can be discovered and eliminated in time, which ensures the reliability of the parking brake.

Based on the above embodiment, acquiring the parking fault detection result of the working machinery according to the feedback signal includes:

acquiring the parking fault detection result of the working machinery according to the comparison result of the feedback signal and the parking control instruction.

Specifically, after the feedback signal of the parking brake component is received, the feedback signal of the parking brake component can be compared with the parking control instruction sent to the parking brake component. If the feedback signal is matched with the parking control instruction, it is determined that there is no parking fault, otherwise, it is determined that there is a parking fault. In response to that it is determined that the parking fault exists, the fault cause can also be predicted according to the feedback signal and the parking control instruction, and the fault cause can be sent to the display apparatus for display, or the alarm can be issued through the alarm apparatus, such as a buzzer alarm, so as to facilitate operator detects and eliminates faults in time. For example, if the feedback signal of the parking brake component indicates that the parking brake component is in the parking state, and the parking control instruction is the parking release instruction, then it indicates that there is the parking fault, and the fault cause is a valve stuck or insufficient brake pressure. If the feedback signal of the parking brake component indicates that the parking brake component is in the parking state, and the parking control instruction is the parking instruction, then it indicates that there is no parking fault and the parking brake is activated. If the feedback signal of the parking brake component indicates that the parking brake component is in the parking release state, and the parking control instruction is the parking instruction, then it indicates that there is the parking fault, and the fault cause is the parking signal feedback component fault, for example, the pressure switch is disconnected. If the feedback signal of the parking brake component indicates that the parking brake component is in the parking release state, and the parking control instruction is the parking release instruction, then it indicates that there is no parking fault and the parking is unlocked.

In an embodiment of the present application, the parking fault detection result of the working machinery is acquired according to the comparison result of the feedback signal and the parking control instruction, and can quickly and accurately determine whether there is a parking fault and the cause of the parking fault, thereby facilitating the operator to promptly discover and eliminate the parking fault and ensuring parking the reliability of the brake, so as to improve the operating safety of the working machinery.

Based on any of the above embodiments, after acquiring the feedback signal of the parking brake component and acquiring the parking fault detection result of the working machinery according to the feedback signal, the method further includes:

- determining whether the gear switching condition is met according to the feedback signal of the parking brake component and/or the parking fault detection result;
- in response to that it is determined that the gear switching condition is met, controlling the gear switching control component to perform gear switching according to the gear switching control signal input by the gear switching component; and
- in response to that it is determined that the gear switching condition is not met, controlling the gear switching control component to switch to the preset gear.

Specifically, after the parking fault detection result is acquired, whether the gear switching condition is met may also be determined according to the feedback signal of the parking brake component and/or the parking fault detection result. The specific method of determining whether the gear switching condition is met can be set according to actual needs. For example, in response to that it is determined that the parking fault exists according to the parking fault detection result, it is determined that the gear switching condition is not met. In response to that it is determined that there is no parking fault according to the parking fault detection result, the current state of the parking brake component is further determined according to the feedback signal of the parking brake component. In response to that the parking brake component is in the parking state, it is determined that the gear switching condition is not met. In response to that the parking brake component is in the parking release state, it is determined that the gear switching condition is met.

The gear switching component is configured for the operator to input the gear switching control signal, for example, it can be the gear lever of working machinery. The gear switching control component is configured to change the direction or the gear of the vehicle according to the gear switching control signal. For example, it can be a gear shift control valve. In response to that it is determined that the gear switching condition is met, the gear switching control component can be controlled to perform gear switching according to the gear switching control signal input by the gear switching component of the working machinery, that is, the gear switching control component is controlled to switch to the gear corresponding to the gear switching control signal. In response to that it is determined that the gear switching condition is not met, regardless of the gear of the gear switching control signal input by the gear switching component, the gear switching control component is controlled to switch to the preset gear, and the preset gear can be a neutral gear.

In an embodiment of the present application, the closed-loop control is performed, in response to that the parking fault occurs or the working machinery is in the parking state, safety hazards caused by mis-driving of the working machinery or the damage to the brake disc caused by the working machinery running in the parking state, which further ensures the safety of the working machinery during shifting gear and reduces the wear and tear to the brake disk.

It can be understood that in response to that it is determined that the gear switching condition is not met, the gear switching control component may not be controlled to perform gear switching.

Based on any of the above embodiments, the method also includes:

- in response to that it is determined that the parking control condition is not met, the gear switching control component is controlled to switch to the preset gear.

Specifically, in response to that it is determined that the parking control condition is not met, that is, when the working machinery is not started, the gear switching control component switches to preset gear, such as the neutral gear, that is, in response to that it is determined that the parking control condition is not met, even if the gear switching component is not in the neutral gear, the gear switching control component is still forced to switch to the neutral gear to avoid safety hazards caused by sudden movement of the working machinery in high gear during starting.

Based on any of the above embodiments, in response to that it is determined that the gear switching condition is met, controlling the gear switching control component to perform gear switching according to the gear switching control signal input by the gear switching component includes:

- in response to that it is determined that the gear switching condition is met, acquiring an original state of the gear switching component; and
- in response to that it is determined that the original state of the gear switching component is matched with the preset gear, controlling the gear switching control component to perform gear switching according to the gear switching control signal input by the gear switching component.

Specifically, the original state of the gear switching component is the current state of the gear switching component when the gear switching condition is met and the gear switching component is operated for the first time. For example, the state of the gear switching component when it is determined that there is no parking fault according to the parking fault detection result and the current state of the gear switching component is determined to be switched from the parking state to the parking release state according to the feedback signal of the parking brake component.

In response to that the original state of the gear switching component is matched with the preset gear, for example, the original state of the gear switching component is the neutral gear, then the gear switching control component can be controlled to perform gear switching according to the gear switching control signal input by the gear switching component until the gear switching condition or the parking control condition is no longer met. In response to that the original state of the gear switching component is not matched with the preset gear, for example, the original state of the gear switching component is not the neutral gear, then the gear switching control component will not be controlled to perform gear switching according to the gear switching control signal input by the gear switching component until the gear switching component returns to the neutral gear, that is, in response to that it is determined that the gear switching condition is met, the gear switching component must be at the neutral gear position to control the gear switching control component to perform gear switching according to the gear switching control signal input by the gear switching component, thereby ensuring the effectiveness of the gear control.

Based on any of the above embodiments, the method also includes:

- in response to that it is determined that the parking control condition is not met, sending a detection signal to the parking brake component;
- acquiring a current signal of a loop where the parking brake component is located; and
- determining the fault detection result of the parking brake component according to the current signal.

Specifically, in response to that it is determined that the parking control condition is not met, that is, when the working machinery is not started, the fault detection is also performed on the parking brake component. For example, when the working machinery is powered-on but not started, the detection signal is sent to the parking brake component. The detection signal can be a pulse signal, such as a pulse current. The current signal of the loop where the parking brake component is located is acquired, and the fault detection result of the parking brake component is determined according to the magnitude of the current signal. The current signal of the loop where the parking brake component is located is generated according to the detection signal.

The loop where the parking brake component is located can be the loop formed by the parking brake component and the controller, for example, the loop formed by the electromagnetic coil of the change valve in the parking brake component and the controller. The specific method of determining the fault detection result of the parking brake component according to the magnitude of the current signal can be set according to actual needs. For example, when the current signal is greater than the first preset value, it is determined that the parking brake component is short-circuited; in response to that the current signal is less than the second preset value, it is determined that the parking brake component is open circuit; in response to that the current signal is between the first preset value and the second preset value, it is determined that the parking brake component is fault-free. The first preset value and the second preset value can be set according to actual needs. For example, the current magnitude of the current pulse is P, the first preset value can be set to 0.98P, and the second preset value can be set to 0.02P. If it is determined that the parking brake component exists a fault according to the fault detection result of the parking brake component, the fault detection result can be sent to the display apparatus for display, or the alarm can be issued through the alarm apparatus.

In an embodiment of the present application, in response to that it is determined that the parking control condition is not met, the detection signal is sent to the parking brake component, and the fault detection result of the parking brake component is determined according to the current signal of the loop where the parking brake component is located, so that a quick and accurate detection can be performed on the parking brake component, which further improves the reliability of the parking brake.

Figure 2:
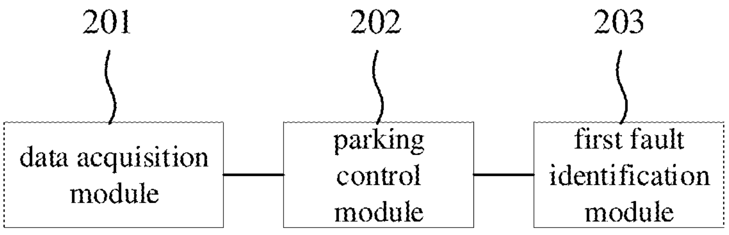
FIG. 2 is a schematic structural view of a parking fault detection apparatus according to an embodiment of the present application.

The parking fault detection apparatus provided by the present application will be described below. The parking fault detection apparatus described below can be correspondingly referred to the parking fault detection method described above. As shown in FIG. 2, the parking fault detection apparatus of the present application includes:

- a data acquisition module 201 configured to acquire a parking control signal; the parking control signal is a parking signal or a parking release signal;
- a parking control module 202 configured to determine that the parking control condition is met, generate a parking control instruction according to the parking control signal and send it to the parking brake component of working machinery; the parking brake component is configured to execute parking or parking release action according to the parking control instruction; the parking control instruction corresponds to the parking control signal; and
- a first fault identification module 203 configured to acquire a feedback signal of the parking brake component, and acquire the parking fault detection result of the working machinery according to the feedback signal.

Based on the above embodiment, the first fault identification module 203 is specifically configured for: acquiring the parking fault detection result of the working machinery according to the comparison result of the feedback signal and the parking control instruction.

Based on any of the above embodiments, the parking fault detection apparatus also includes a gear control module, and the gear control module is configured for:

- determining whether the gear switching condition is met according to the feedback signal of the parking brake component and/or the parking fault detection result;
- in response to that it is determined that the gear switching condition is met, controlling the gear switching control component to perform gear switching according to the gear switching control signal input by the gear switching component; and
- in response to that it is determined that the gear switching condition is not met, controlling the gear switching control component to switch to the preset gear.

Based on any of the above embodiments, the gear control module is also configured for: in response to that it is determined that the parking control condition is not met, the gear switching control component is controlled to switch to the preset gear.

Based on any of the above embodiments, the gear control module is specifically configured for:

- in response to that it is determined that the gear switching condition is met, acquiring the original state of the gear switching component; and
- in response to that it is determined that the original state of the gear switching component is matched with the preset gear, controlling the gear switching control component to perform gear switching according to the gear switching control signal input by the gear switching component.

Based on any of the above embodiments, the parking fault detection apparatus also includes a second fault detection module, and the second fault detection module is configured for:

- in response to that it is determined that the parking control condition is not met, sending a detection signal to the parking brake component;
- acquiring the current signal of the loop where the parking brake component is located; and
- determining the fault detection result of the parking brake component according to the current signal.

Figure 3:
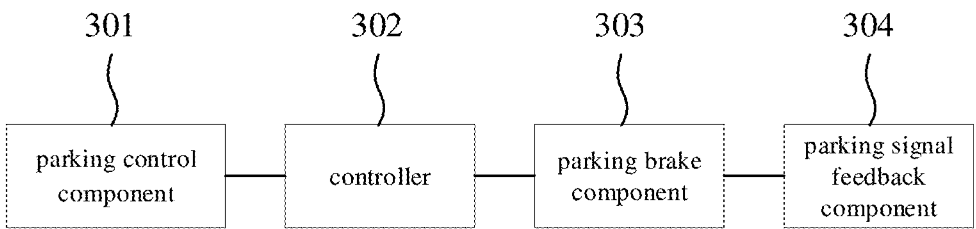
FIG. 3 is a schematic structural view of a parking fault detection system according to an embodiment of the present application.

The parking fault detection system provided by the present application is described below. The parking fault detection system described below can correspond to the parking fault detection method described above. As shown in FIG. 3, the parking fault detection system of the present application includes: a controller 302, a parking control component 301 and a parking signal feedback component 304;

the parking control component 301 is configured to acquire the parking control signal and send it to the controller 302; the parking control signal is the parking signal or the parking release signal;

the parking signal feedback component 304 is configured to acquire the feedback signal of the parking brake component 303 of working machinery and send it to the controller 302;

the controller 302 is communicatively connected to the parking control component 301 and the parking signal feedback component 304 respectively, and is configured to generate the parking control instruction according to the parking control signal and send it to the parking brake component 303 in response to that it is determined that the parking control condition is met; the parking brake component 303 is configured to perform parking or parking release action according to the parking control instruction; the parking control instruction corresponds to the parking control signal; the parking brake component 303 is also configured to acquire the parking fault detection result of the working machinery according to the feedback signal of the parking brake component 303.

Specifically, the controller 302 can be the controller of the working machinery, such as a gearbox controller, or a new controller.

Figure 4:
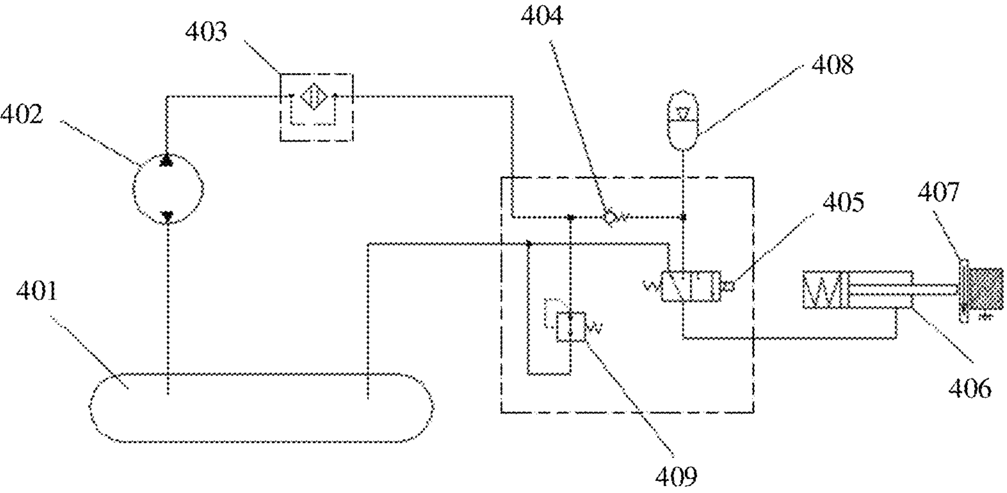
FIG. 4 is a schematic structural view of a parking brake component according to an embodiment of the present application.

The structure and working process of the parking fault detection system of the present application are described in detail below through an embodiment. In the embodiment of the present application, the structural view of the parking brake component 303 is shown in FIG. 4, including: a fuel tank 401, an oil pump 402, an oil filter 403, a check valve 404, a change valve 405, a brake oil cylinder 406, and a brake disk 407 connected in sequence. An accumulator 408 is connected between the check valve 404 and the change valve 405, the change valve 405 is connected with the fuel tank 401, and a relief valve 409 is connected between the oil filter 403 and the fuel tank 401.

The principle of the parking brake component 303 to execute parking release is:

when there is a power source output and the change valve 405 is powered on, the oil pump 402 is driven by the power source (such as an engine) to absorb the hydraulic oil from the fuel tank 401. The hydraulic oil is filtered by the oil filter 403, flows into the accumulator 408 through the check valve 404, and flows into the small chamber of the brake oil cylinder 406 through the check valve 404 and the change valve 405. The brake disk 407 is driven by the piston rod of the brake oil cylinder 406 to retract to achieve brake release, and the brake disk 407 is fixed at the output shaft of the gearbox. After the parking brake, the output shaft of the gearbox cannot rotate to switch gears.

When there is no power source output, the hydraulic oil in the accumulator 408 flows into the small chamber of the brake oil cylinder 406 through the change valve 405. The brake disk 407 is driven to retract through the piston rod of the brake oil cylinder 406 to achieve parking release.

The principle of the parking brake component 303 to execute parking is:

when the change valve 405 loses power, the hydraulic oil in the small chamber of the brake oil cylinder 406 flows back to the fuel tank 401 through the change valve 405. At the same time, the hydraulic oil in the oil filter 403 flows into the fuel tank 401 through the relief valve 409. The brake disk 407 is compressed by the piston rod of the brake oil cylinder 406, so as to achieve parking brake.

By setting the accumulator 408 and the check valve 404, after the hydraulic oil source fails, it still has the ability to maintain pressure to complete the parking release, further avoiding damage to the brake disk 407 resulting from the working machinery driving in the parking state caused by the failure of the parking release.

Figure 5:
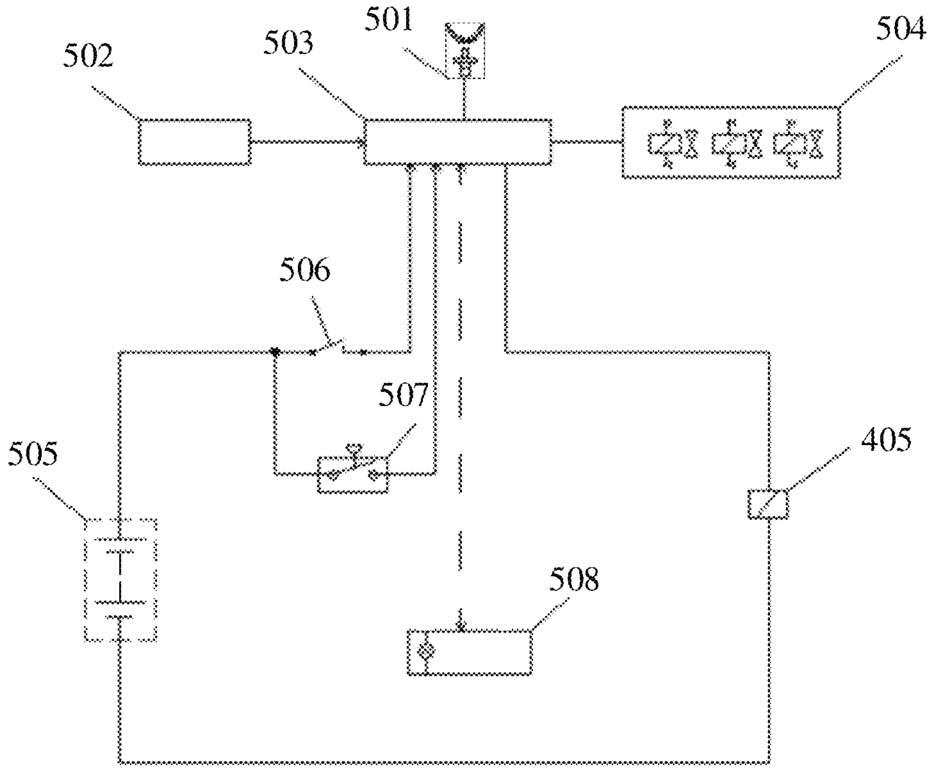
FIG. 5 is a schematic structural view of the parking fault detection system according to an embodiment of the present application.

The parking fault detection system is shown in FIG. 5, which includes: a rotational speed sensor 501, a gear lever 502, a gearbox controller 503, a gear operating valve 504, a battery 505, a parking release switch 506, a pressure switch 507 and an instrument 508. In FIG. 5, the dotted line between the gearbox controller 503 and the instrument 508 represents the transmission of bus signals.

The gearbox controller 503 completes parking and parking release by controlling the change valve 405 to change direction. The pressure switch 507 is connected to the outlet of the change valve 405. The rotational speed sensor 501, the gear lever 502, the gear operating valve 504 and the instrument 508 are all connected to the gearbox controller 503. The parking release switch 506, the gearbox controller 503, the change valve 405 and the battery 505 are connected in series to form a loop. One end of the pressure switch 507 is connected to the positive electrode of the battery 505, and the other end of the pressure switch 507 is connected to gearbox controller 503.

The specific working process of the parking fault detection system is as follows.

When parking release is required, the parking release switch 506 is closed, and the power signal in the battery 505 is transmitted to the gearbox controller 503 through the parking release switch 506. The gearbox controller 503 receives the high level parking release signal. In response to that the gearbox controller 503 determines that it is not started according to the rotational speed signal of the engine collected by the rotational speed sensor 501, the gearbox controller 503 has no output to the change valve 405, and the brake disk 407 is always in the braking state. At the same time, the gearbox controller 503 controls the gear operating valve 504 to switch to the neutral gear. In response to that the gearbox controller 503 determines that it is started according to the rotational speed signal of the engine collected by the rotational speed sensor 501, the gearbox controller 503 sends a high level parking release command to the change valve 405, and controls the change valve 405 to be powered on to achieve parking release. The pressure switch 507 installed at the outlet of the change valve 405 is disconnected under pressure, and the power signal in the battery 505 stops transmitting to the gearbox controller 503 through the pressure switch 507. That is, the gearbox controller 503 receives the low level feedback signal and transmits it to the instrument 508 through the gearbox controller 503, and the brake light in the instrument 508 goes out.

When parking is required, the parking release switch 506 is disconnected, and the power signal in the battery 505 stops transmitting to the gearbox controller 503 through the parking release switch 506. The gearbox controller 503 receives the low level parking signal. The gearbox controller 503 sends the low level parking instruction to the change valve 405, controls the change valve 405 to lose power and complete parking. The pressure switch 507 installed at the outlet of the change valve 405 is closed, and the power signal in the battery 505 is transmitted to the gearbox controller 503 through the pressure switch 507, that is, the gearbox controller 503 receives the high level feedback signal, the parking signal is sent to instrument 508 through the gearbox controller 503, and the brake light in the instrument 508 lights up.

During the process of parking release and parking control, the gearbox controller 503 also performs parking fault detection according to the received feedback signal and the parking control instruction sent to the change valve 405. For example, in response to that the received feedback signal is the low level signal, then it indicates that the change valve 405 is in the parking release state; in response to that the received feedback signal is a high level signal, then it indicates that the change valve 405 is in the parking state. In response to that the parking control instruction sent to the change valve 405 is the high level signal, then it indicates that the parking control instruction sent to the change valve 405 is a parking release instruction; in response to that the parking control instruction sent to the change valve 405 is the low level signal, then it indicates that the parking control instruction sent to the change valve 405 is a parking instruction. The gearbox controller 503 performs parking fault detection by comparing the feedback signal with the parking control instruction sent to the change valve 405. For example, in response to that the feedback signal is the high level signal, and the parking control instruction sent to the change valve 405 is the high level signal, then it indicates that there is a parking fault, and the fault cause is a valve stuck or insufficient brake pressure. In response to that the feedback signal is the high level signal, and the parking control instruction sent to the change valve 405 is the low level signal, then it indicates that there is no parking fault and the parking brake is activated; in response to that the feedback signal is the low level signal, and the parking control instruction sent to the change valve 405 is the high level signal, then it indicates that there is no parking fault, and the parking is unlocked. In response to that the feedback signal is the low level signal, and the parking control instruction sent to the change valve 405 is the low level signal, then it indicates that there is no parking fault, and the fault cause is that the pressure switch 507 is disconnected. The gearbox controller 503 sends the parking fault detection result to the instrument 508. When there is no parking fault, the current parking state/parking release state of the working machinery is displayed through the instrument 508. When there is the parking fault, the cause of the parking fault is displayed through the instrument 508.

In response to that the gearbox controller 503 determines that the parking fault exists according to the parking fault detection result, or determines that there is no parking fault according to the parking fault detection result and determines that the change valve 405 is in the parking state according to the received feedback signal, the gear operating valve 504 is controlled to switch to the neutral gear.

In response to that the gearbox controller 503 determines that there is no parking fault according to the parking fault detection result, and determines that the change valve 405 is in the parking release state according to the received feedback signal, it further determines the original state of the gear lever. In response to that the original state of the gear lever is the neutral gear state, the gear operating valve 504 is controlled to perform gear switching according to the gear switching control signal sent by the gear lever 502; in response to that the original state of the gear lever is not the neutral gear state, the gear switching control signal sent by the gear lever will not be identified until the gear lever is detected to return to the neutral gear, and the gear operating valve 504 is controlled to perform gear switching according to the gear switching control signal sent by the gear lever. At the same time, the gearbox controller 503 also sends the gear switching control signal sent by the gear lever to the instrument 508 for display.

When the working machinery is powered on, the gearbox controller 503 sends a pulse current to the change valve 405, and detects the actual current in the current loop where the electromagnetic coil of the change valve 405 is located, so as to perform the fault detection to the change valve 405. Assuming that the maximum output current capability of the control port of the gearbox controller 503 is P. In response to that the detected actual current is less than 0.02P, then it indicates that the change valve 405 is open circuit. In response to that the detected actual current is greater than 0.98P, then it indicates that the change valve 405 is short circuited, otherwise it indicates that the change valve 405 is fault-free. When detecting that the change valve 405 is open or short-circuited, the gearbox controller 503 sends a fault detection result to the instrument 508 to display the fault detection result of the change valve 405 through the instrument 508.

The present application also provides a working machinery, including a parking brake component and the parking fault detection system as described in any of the above embodiments.

Specifically, the working machinery is an electric working machinery, such as an electric crane, an electric loader, etc.

Figure 6:
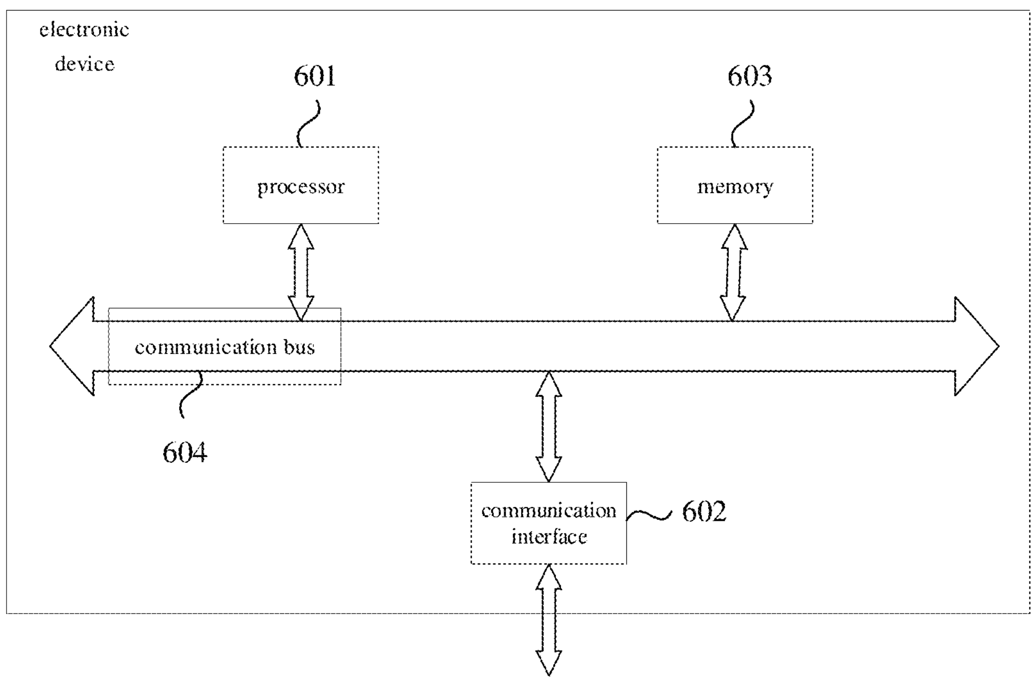
FIG. 6 is a schematic structural view of an electronic device according to an embodiment of the present application.

FIG. 6 illustrates a schematic view of a structure of an electronic device. As shown in FIG. 6, the electronic device may include: a processor 601, a communication interface 602, a memory 603 and a communication bus 604. The processor 601, the communication interface 602, and the memory 603 complete communication with each other through the communication bus 604. The processor 601 can call the logical instructions in the memory 603 to execute the parking fault detection method. The method includes: acquiring the parking control signal; the parking control signal is the parking signal or the parking release signal;

in response to that it is determined that the parking control condition is met, generating the parking control instruction according to the parking control signal and sending it to the parking brake component of the working machinery; the parking brake component is configured to execute parking or parking release action according to the parking control instruction; and the parking control instruction corresponds to the parking control signal; and acquiring the feedback signal of the parking brake component, and acquiring the parking fault detection result of the working machinery according to the feedback signal parking.

In addition, the logical instructions in the memory 603 can be implemented in the form of software functional units and can be stored in a computer-readable storage medium when sold or used as an independent product. Based on this understanding, the technical solution of the present application is essentially or the part that contributes to the existing technology or the part of the technical solution can be embodied in the form of a software product. The computer software product is stored in a storage medium, including several instructions are configured to cause a computer device, which may be a personal computer, a server, or a network device, etc., to execute all or part of the steps of the methods described in various embodiments of the present application. The storage media include: U disk, mobile hard disk, read-only memory (ROM), random access memory (RAM), magnetic disk or optical disk and other media that can store program code.

On the other hand, the present application also provides a computer program product. The computer program product includes a computer program stored on a non-transitory computer-readable storage medium. The computer program includes program instructions. When the program instructions are executed by the computer, the computer can execute the parking fault detection method provided by each of the above methods. The method includes: acquiring the parking control signal; the parking control signal is the parking signal or the parking release signal;

in response to that it is determined that the parking control condition is met, generating the parking control instruction according to the parking control signal and sending it to the parking brake component of the working machinery; the parking brake component is configured to execute parking or parking release action according to the parking control instruction; and the parking control instruction corresponds to the parking control signal; and acquiring the feedback signal of the parking brake component, and acquiring the parking fault detection result of the working machinery according to the feedback signal parking.

In another aspect, the present application also provides a non-transitory computer-readable storage medium, on which a computer program is stored, which is implemented when executed by the processor to perform the above-mentioned parking fault detection method. The method includes: acquiring the parking control signal; the parking control signal is the parking signal or the parking release signal;

in response to that it is determined that the parking control condition is met, generating the parking control instruction according to the parking control signal and sending it to the parking brake component of the working machinery; the parking brake component is configured to execute parking or parking release action according to the parking control instruction; and the parking control instruction corresponds to the parking control signal; and acquiring the feedback signal of the parking brake component, and acquiring the parking fault detection result of the working machinery according to the feedback signal parking.

The above-described apparatus embodiments are only illustrative, in which the units described as separate assemblies may or may not be physically separated, and the assembly shown as units may or may not be physical units, that is, they may be located at one location, or it can be distributed across multiple network units. Some or all of the modules can be selected according to actual needs to achieve the purpose of the solution of this embodiment. Those skilled in the art can understand and implement the method without any creative effort.

Through the above description of the embodiments, those skilled in the art can clearly understand that each embodiment can be implemented by software plus a necessary general hardware platform, and of course, it can also be implemented by hardware. Based on this understanding, the part of the above technical solution that essentially contributes to the existing technology can be embodied in the form of a software product. The computer software product can be stored in a computer-readable storage medium, such as ROM/RAM, magnetic disc, optical disk, etc., including a number of instructions to cause a computer device, which can be a personal computer, a server, or a network device, etc., to execute the methods described in various embodiments or certain parts of the embodiments.

It should be noted that the above embodiments are only used to illustrate the technical solution of the present application, but not to limit it. Although the present application has been described in detail with reference to the embodiments, those of skilled in the art should understand that modifications may still be made to the technical solutions described in the embodiments, or equivalent substitutions may be made to some of the technical features. However, these modifications or substitutions do not cause the essence of the corresponding technical solutions to deviate from the spirit and scope of the technical solutions of the embodiments of the present application.

What is claimed is:

1. A parking fault detection method, comprising:

acquiring a parking control signal; wherein the parking control signal is a parking signal or a parking release signal;

in response to that it is determined that a parking control condition is met, generating a parking control instruction according to the parking control signal and sending the parking control instruction to a parking brake component of a working machinery; wherein the parking brake component is configured to execute parking or parking release action according to the parking control instruction, and the parking control instruction is configured to correspond to the parking control signal; and acquiring a feedback signal of the parking brake component, and acquiring a parking fault detection result of the working machinery according to the feedback signal;

wherein the acquiring the parking fault detection result of the working machinery according to the feedback signal comprises: acquiring the parking fault detection result of the working machinery according to a comparison result of the feedback signal and the parking control instruction;

in response to that the feedback signal of the parking brake component indicates that the parking brake component is in a parking state, and the parking control instruction is a parking release instruction, it is indicated that there is the parking fault, and a fault cause is a valve stuck or insufficient brake pressure; and in response to that the feedback signal of the parking brake component indicates that the parking brake component is in a parking release state, and the parking control instruction is a parking instruction, it is indicated that there is the parking fault, and the fault cause is a parking signal feedback component fault.

2. The parking fault detection method according to claim 1, wherein after the acquiring the feedback signal of the parking brake component, and acquiring the parking fault detection result of the working machinery according to the feedback signal, the method further comprises:

determining whether a gear switching condition is met according to the feedback signal of the parking brake component and/or the parking fault detection result;

in response to that it is determined that the gear switching condition is met, controlling the gear switching control component of the working machinery to perform gear switching according to a gear switching control signal input by a gear switching component of the working machinery; and in response to that it is determined that the gear switching condition is not met, controlling the gear switching control component to switch to a preset gear.

3. The parking fault detection method according to claim 2, further comprising:

in response to that it is determined that the parking control condition is not met, controlling the gear switching control component to switch to the preset gear.

4. The parking fault detection method according to claim 2, wherein the in response to that it is determined that the gear switching condition is met, controlling the gear switching control component of the working machinery to perform gear switching according to the gear switching control signal input by the gear switching component of the working machinery comprises:

in response to that it is determined that the gear switching condition is met, acquiring an original state of the gear switching component; and in response to that it is determined that the original state of the gear switching component is matched with the preset gear, controlling the gear switching control component to perform gear switching according to the gear switching control signal input by the gear switching component.

5. The parking fault detection method according to claim 1, further comprising:

in response to that it is determined that the parking control condition is not met, sending a detection signal to the parking brake component;

acquiring a current signal of a loop where the parking brake component is located; and determining the fault detection result of the parking brake component according to the current signal.

6. An electronic device, comprising:

a processor; and a memory storing a computer program executable on the processor, wherein when the computer program is executed by the processor, the parking fault detection method according to claim 1 is performed.

7. A non-transitory computer-readable storage medium storing a computer program, wherein when the computer program is executed by a processor, the parking fault detection method according to claim 1 is performed.

8. A parking fault detection system, comprising:

a controller;

a parking control component; and a parking signal feedback component;

wherein the parking control component is configured to acquire a parking control signal and send the parking control signal to the controller, and the parking control signal is a parking signal or a parking release signal;

the parking signal feedback component is configured to acquire a feedback signal of a parking brake component of a working machinery and send the feedback signal to the controller;

the controller is respectively connected to the parking control component and the parking signal feedback component, and is configured to, in response to that it is determined that the parking control condition is met, generate a parking control instruction according to the parking control signal and send the parking control instruction to the parking brake component; wherein the parking brake component is configured to perform parking or parking release action according to the parking control instruction; the parking control instruction is configured to correspond to the parking control signal; and the parking brake component is configured to acquire a parking fault detection result of the working machinery according to a comparison result of the feedback signal and the parking control instruction;

in response to that the feedback signal of the parking brake component indicates that the parking brake component is in a parking state, and the parking control instruction is a parking release instruction, the controller is configured to indicate that there is the parking fault, and a fault cause is a valve stuck or insufficient brake pressure; and in response to that the feedback signal of the parking brake component indicates that the parking brake component is in a parking release state, and the parking control instruction is a parking instruction, the controller is configured to indicate that there is the parking fault, and the fault cause is a parking signal feedback component fault.

9. A working machinery, comprising: a parking brake component and the parking fault detection system according to claim 8.

* * * * *